Patented June 8, 1943

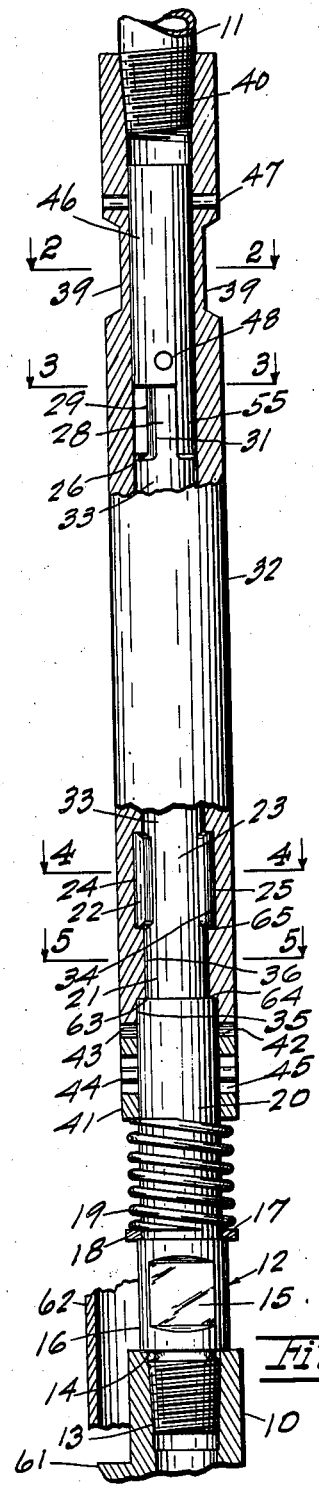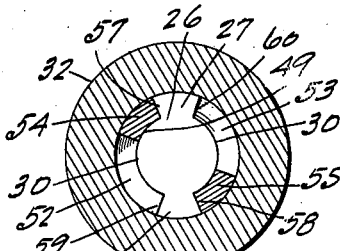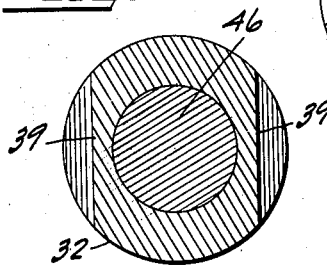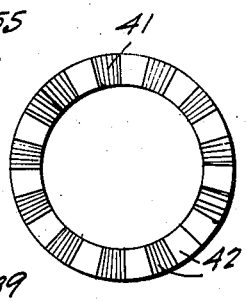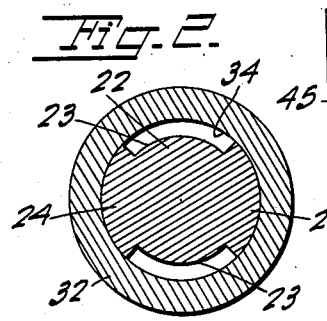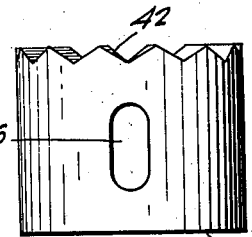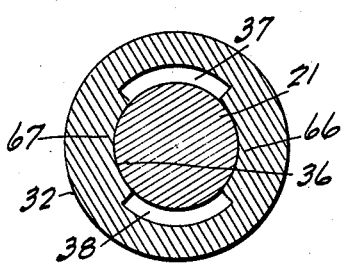

2,321,215

UNITED STATES PATENT OFFICE 2,321,215

SAFETY COUPLING FOR SUCKER RODS

Hartley Burton Lee, Berkeley, Calif.

Application October 5, 1940, Serial No. 359,892

4 Claims. (Cl. 255—28)

This invention, a safety coupling for sucker rods, is primarily designed for use in connection with reciprocating pumps for oil wells. It provides a convenient and easily attachable and detachable connection between the pump plunger rod and the sucker rod, through the medium of which the sucker rod may be released from or attached to the pump plunger at will, thereby permitting removal and replacement of the sucker rod without disturbing the lift pipe, pump plunger, or pump cylinder. Obviously, this coupling can be used with other apparatus of related nature, and for pumping materials other than oil.

The objects and advantages of the invention are as follows:

First; to provide a connection between the sucker rod and the plunger of a pump, which can be released or attached at will while the pump plunger is located in its normal pumping position in the well, thereby eliminating the necessity of removing any other parts of the pump when the sucker rod is to be removed.

Second; to provide a connection as outlined which will lock and align the pump plunger and sucker rod in definite relation.

Third; to provide a connection as outlined in which the connection is provided with aligning means to assure proper alignment of the sucker rod with the plunger rod.

Fourth; to provide the said connection with locking means which is operable through a slight rotary movement of the sucker rod for attaching or releasing the sucker rod at will and to provide means automatically actuable for maintaining the locked position against any rotating tendency on the part of the pump plunger.

Fifth; to provide a clutch which will maintain the relation between the sucker rod and pump plunger against rotative urgence of the plunger, but which is releasable under application of torque applied through the sucker rod, with the value of the torque less than that of the frictional resistance of the pump plunger to rotation.

In describing the invention reference will be made to the accompanying drawing, in which:

Fig. 1 is a sectional elevation through the invention.

Figs. 2, 3, 4, and 5 are enlarged sections taken respectively on lines 2—2, 3—3, 4—4 and 5—5 of Fig. 1.

Fig. 6 is an enlarged top plan view of the clutch.

Fig. 7 is a side elevation of Fig. 6.

This invention forms a releasable connection between a plunger rod 10 and a sucker rod 11 of a deep-well pump of the type customarily used for pumping oil from oil wells. By the use of this invention it is unnecessary to draw the plunger or any other parts of the pump when the pump requires de-sanding or cleaning.

The coupling consists of a male section and a female section which interfit and interlock when the sucker rod is lowered to make the connection and then turned through a quarter turn; and release when the connected sucker rod is turned in the opposite direction through a quarter turn, though the sucker rod may be turned in excess of a quarter turn and still accomplish the same results. The connection is supplied with holding means which retains the plunger rod against rotation relative to the sucker rod, but which permits the sucker rod to be rotated relative to the plunger rod because the holding means has slightly less resistance against holding than the frictional resistance of the plunger against turning.

The male portion of the connection consists of a shaft 12 which fits freely in the female section and is provided with suitable securing means at its lower end such as the threaded portion 13, for securing it to the plunger rod 10 and to which it is tightly secured; a suitable shoulder 14 being provided to seat on the top of the plunger rod for perfect alignment.

Above this shoulder the shaft is provided with wrench flats 15 to facilitate removal or tightening of the shaft in the plunger rod, and this enlarged portion 16 on which the flats 15 are formed, terminates in a shoulder 17 on which rests a washer 18 which forms a seat for the spring 19 which encompasses the reduced portion 20 of the shaft.

This shaft is further reduced at 21 while at 22 it is turned to the same diameter as the section 20, following which two sides of this portion 22 are shaped as at 23 to the same diameter as the section 21, leaving two keys 24 and 25 which include slightly less than a quarter circle each, and at the very top of the shaft stop means is provided.

This stop means consists of a portion 26 having integral wing members forming opposed keys 27 and 28 the intervening portions 29 between the keys preferably being rounded as indicated at 30, to provide strength and rigidity and to center the shaft which fits loosely in the bore in the sleeve.

The female portion telescopes over the male portion and consists of a sleeve 32 which is bored throughout its length to slidably and freely receive the portions 33 and 21 of the shaft 12. This bore is enlarged at 34 to slidably and rotatably receive the key portion 22 of the shaft, and the sleeve is counterbored at 35 to receive the enlarged portion 20 of the shaft.

Between the counterbore 35 and the enlarged bore 34 the intermediate bore 36 is slotted out as indicated at 37 and 38 to form passages for the keys 24 and 25, and the length of the enlarged bore is approximately equal though slightly greater than the length of the keys 24 and 25. The sleeve is provided with suitable wrench flats 39, and suitable coupling means such as the threaded aperture 40 is provided for coupling the sleeve to the sucker rod 11.

Slidably mounted on the enlarged portion 20 of the shaft is a clutch 41 in the form of a sleeve which is provided on its upper face with a multiplicity of double inclined teeth 42, and mating teeth 43 are formed on the bottom end of the sleeve 32. This clutch is held on the shaft by the pin 44, and a suitable slot 45 formed diametrically through the clutch permits the spring 19 to urge positive engagement of the teeth 42 with those 43 formed on the bottom of the sleeve 32.

Mounted in the upper end of the sleeve is a plug 46 at the lower end of which stop means is provided for cooperation with the stop means at the upper end of the shaft. This plug is fixed in the sleeve and the stop means is formed by axially boring the lower end of the plug to telescopically fit over the rounded portions 30 of the stop formed at the upper end of the shaft as indicated at 49. The walls of this bore are then partly cut away as indicated at 52 and 53 leaving two depending fingers 54 and 55 for cooperation with the wing members 27 and 28. This plug is secured in place, such as by pinning as indicated at 47 and 48 after the various members of the unit have been properly assembled and adjusted to their proper positions. Each of the wing members 27 and 28 and fingers 54 and 55 include an angle of about 45° leaving about 90° free space on each side for relative rotation of the shaft 12 and sleeve 32.

As illustrated in Fig. 3 the faces 57 and 58 of the wing members 27 and 28 are in contact with the fingers 54 and 55, the keys 24 and 25 are supported on the intervening metal 66 and 67 between the slots 37 and 38, completing the coupling. If the shaft 12 is rotated counterclockwise, viewing Fig. 3 against the resistance of the clutch 41, the faces 59 and 60 of the wing members 27 and 28 will come in contact with and be stopped by the fingers 54 and 55, with the keys 24 and 25 in alignment with the slots 37 and 38, leaving the shaft and sleeve free for separation from each other.

Installation and operation are carried out as follows: The shaft 12 is tightly fitted to the plunger rod 10 and the sleeve 32 is tightly fitted to the sucker rod 11. Assuming that the pump has been in operation and that the sucker rod is to be removed, the sucker rod is first uncoupled from the jack and is then given a quarter turn or more which moves the keys 54 and 55 from contact with the key faces 57 and 58 to contact with the key faces 59 and 60, which brings the keys 24 and 25 in alignment with the slots 37 and 38, during which time the clutch teeth 43 ratchet over the teeth 42, the frictional resistance to rotation of the pump plunger being sufficient to prevent rotation of the plunger rod 10, and the tension of the spring 19 being just sufficient to permit relative movement of the clutch elements without overcoming the frictional resistance of the plunger 61 in the pump cylinder 62. Although showing merely a stub connection between the plunger rod 13 and plunger 62, the actual length of the plunger rod would ordinarily be much greater, possibly even ten or fifteen feet in length.

With the keys 24 and 25 in alignment with the passages 37 and 38, the sucker rod can be removed from the well, leaving the plunger rod with the coupling shaft, and clutch Fig. 7 in place.

When the sucker rod is to be replaced, it is lowered until it comes to rest. It is then rotated through a portion of a revolution to align the keys with the passages and then lowered further until the top 63 of the counterbore rests on the shoulder 64 at which time the keys 24 and 25 will have passed through the passages 37 and 38 and the bottoms of the keys will be in alignment with the tops 65 of the keys 66 and 67. The sucker rod is then turned through a quarter turn which locates the keys 24 and 25 directly over the keys 66 and 67, and the clutch maintains the relative position of plunger rod and sucker rod during pumping operations. The keys 27 and 28 and stops 54 and 55 limit the rotational movement of the sleeve relative to the shaft, therefore the rotation of the sucker rod need not be limited to a quarter turn, because additional rotational movement will merely rotate the plunger rod but will keep the keys in interlocking position.

It will be understood that variations in construction and arrangement of parts, which variations are consistent with the appended claims, may be resorted to without detracting from the spirit or scope of the invention, or sacrificing any of the advantages thereof.

I claim:

1. Means for axially coupling two rods in a position accessible solely to one of the rods, comprising: a shaft and means for coupling said shaft to one rod; a sleeve telescopic over said shaft and means for coupling said sleeve to the other rod; cooperative interlocking means for locking said shaft and sleeve against relative axial movement, and formed on said shaft and in said sleeve and operable through rotation of said sleeve on said shaft in one direction; guiding means on the upper end of said shaft and within said sleeve for axially aligning said shaft at its upper end in the upper end of the bore of said sleeve; cooperative stop means included in said guiding means for limiting the rotative movement of said sleeve on said shaft; and clutch means associated with said shaft for cooperation with said sleeve for maintaining the relative positions of said shaft and sleeve when interlocked; said means being releasable under predetermined torque differential with rotation in an opposite direction to move said interlocking means to nonlocking position to permit removal of said sleeve from said shaft.

2. A coupling for coupling and uncoupling rods at a remote point accessible solely to one of the rods, comprising: a cylindrical element affixable at one of its ends to one rod and having a main bore formed throughout its length and a counterbore formed in its other end, and an enlarged bore formed in spaced relation to the bottom of said counterbore, and passages formed axially in the main bore walls and connecting said counterbore and said enlarged bore; a shaft element affixable at one of its ends to the other rod and fitting within said counterbore and thence throughout the main bore and having integral coupling keys passable through said passages to the enlarged bore and rotatable in said enlarged bore and fitting closely between the ends of said enlarged bore, and cooperative means associated with said cylindrical element and with said shaft element for limiting the rotation of one element relative to the other to positions in which said keys are respectively in axial alignment with said passages and in engaging position over the intervening portions of the main bore walls between the passages, and means cooperating between said cylindrical element and said shaft element maintaining the relative adjustment of the coupling keys and passages except under conditions of abnormal torque differential between the rods, whereby through advance of one of said elements by means of the rod to which it is affixed into telescopic relation with the other element followed by partial rotation of the rod, coupling of the elements results, and partial rotation in a reverse direction results in uncoupling thereof for withdrawal of the rod at will.

3. Means for coupling and uncoupling rods at a remote point accessible solely to one of the rods, comprising: a cylindrical member having a bore formed throughout its length, rod connecting means formed at one end, a counterbore formed in the other end, and an enlarged bore formed in spaced relation to the bottom of said counterbore, and two arcuate slots having a diameter equal to that of the enlarged bore and oppositely located and including each an angle of approximately 90° and extending through the intervening portion between the counterbore and enlarged bore, and a continuous series of double inclined teeth formed at the other end of said cylindrical member; a plug fixed in said one end in said bore and having depending fingers oppositely located relative to the axis of the plug to form depending stop elements; a stepped shaft element having rod connecting means formed at one end and fitting said counterbore and said bore and having arcuate locking elements each with a length equal to that of the enlarged bore and an arcuate width clearing the walls of said arcuate slots and with a diameter rotatable in said enlarged bore, the other end of said shaft element having arcuate portions rotatably fitting between said depending fingers with stop elements formed integrally and projecting radially for cooperation with said depending fingers; and a clutch slidable and non-rotatable on said shaft element and having teeth mating the teeth formed at the other end of said cylindrical element, and a spring urging said teeth into engagement for releasably securing said cylindrical member and shaft element in their instant relative positions and requiring predetermined torque differential to overcome the resistance of said clutch to unlock said member and element and thus uncouple the rods.

4. A coupling comprising: two telescopic elements including a shaft and a cylindrical sleeve; said cylindrical sleeve having a bore throughout its length and beginning at its lower end in a counterbore and terminating at its upper end in a threaded bore for connection to a rod, and an enlarged bore having a diameter substantially equal to that of the counterbore and formed in spaced relation to said counterbore and having end walls in a plane at right angles to the axis of the sleeve, and slots connecting said counterbore and said enlarged bore and having a diameter substantially equal thereto, and double-inclined teeth formed at the lower end of said sleeve; a plug fixed in the upper end of said bore and having depending fingers oppositely located relative to the axis to function as stop members; said shaft including a main portion fitting within said counterbore and extending downwardly and having rod-connecting means at its lower end and having a double-inclined toothed clutch slidable and non-rotatable on said main portion for cooperation with the teeth formed on the lower end of said sleeve, and a spring urging said clutch to cooperate with the lower end of said sleeve, radially projecting keys having an external diameter substantially equal to that of the enlarged bore and passable through said slots and having a length equal to that of the enlarged bore and having plane ends at right angles to the axis of the shaft, and stop elements formed on the upper end of said shaft for cooperation with said fingers for limiting rotation of the shaft within the sleeve to two respective positions, in one of which the shaft and sleeve are locked together, and in the other of which the shaft and sleeve are free to be separated.

HARTLEY BURTON LEE.